United States Patent Office 3,597,313
Patented Aug. 3, 1971

3,597,313
POLYALDEHYDE CROSSLINKED ALIPHATIC ALCOHOL RESINS AND A PROCESS OF MAKING TEMPORARY WET STRENGTH PAPER AND PAPER MADE THEREFROM
Laurence Lyman Williams, Stamford, and Anthony Thomas Coscia, South Norwalk, Conn., assignors to American Cyanamid Company, Stamford, Conn.
No Drawing. Filed Sept. 23, 1968, Ser. No. 761,798
Int. Cl. D21h 3/44; C08f 27/18
U.S. Cl. 162—167          10 Claims

ABSTRACT OF THE DISCLOSURE

Wet-strength resins are provided which afford temporary wet strength to paper products. The resins are cationic polymers of unsaturated aliphatic alcohols reacted with polyaldehydes. They are prepared, for example, by cyanamide modification of polyvinyl alcohol polymers, followed by glyoxal cross-linking; or by copolymerization of vinyl acetate and diallyldimethylammonium chloride, followed by hydrolysis and glyoxal cross-linking. These resins are adsorbed on paper-making fibers in aqueous suspension during the paper-making process and impart temporary wet strength to resulting paper products such as tissue, paper towels and the like.

This invention relates to wet-strength resins. More particularly, it relates to cationic, thermosetting, resinous reaction products of polyaldehydes and water-soluble, cationic unsaturated alcohol polymers, and to the use of these resins in imparting temporary wet strength to paper.

Wet-strength resins are important specialty additives in the papermaking industry. These resins are generally hydrolysis-resistant, and are added to aqueous suspensions of cellulosic fibers in the paper-making process to produce a resultant paper product having improved wet strength.

Good wet-strength properties are particularly important in such paper products as napkins, paper towels, household tissues, disposable hospital wear, bed sheets, etc. and similar products that are likely to come into contact with water in use, and thus should have good hydrolysis resistance. Paper products of this type, however, are generally disposed of, after brief periods of usage, in septic systems or the like, and clogging of these systems can result if the products permanently retain their hydrolysis-resistant properties.

In accordance with the present invention, it has been found possible to utilize in the paper-making process resins which provide only temporary wet strength to the paper products. The paper products produced according to this invention, therefore, are disintegrated or repulped easily and conveniently on prolonged contact with water.

Further, it is not necessary to use chemical agents in repulping the temporary wet-strength paper produced in accordance with this invention. Because of the temporary character of the wet strength imparted to these paper products, they can be disposed of in conventional septic systems and greatly decrease the danger of clogging the systems heretofore encountered.

The resins of this invention are water-soluble, cationic polymers of unsaturated, aliphatic alcohols which have been reacted with a sufficient amount of a polyaldehyde to render them thermosetting when heated briefly at 100° C.

The basic constituents of the resins of this invention are an unsaturated alcohol constituent, a cationic constituent, and a cross-linking constituent. The unsaturated alcohol and cationic constituents cooperate to form a cationic polymer of the unsaturated alcohol. This cationic polymer consists of alcohol linkages, such as

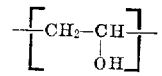

or the like, and cationic linkages. They can be cationic modified homopolymers of an unsaturated alcohol, copolymers of an unsaturated alcoholic monomer and a cationic monomer, and cationic vinyl polymers, some of the substituents of which have been converted to alcohol substituents.

The cationic polymer of this invention can, thus, be produced in three ways. An unsaturated alcohol polymer containing a multiplicity of hydroxy radicals can be reacted with cyanamide or the like to convert some of the hydroxy radicals of the polyvinyl alcohol polymer chain to cationic substituents; or an unsaturated alcoholic monomer can be polymerized with a cationic monomer to produce a polymer chain containing alcoholic linkages and cationic linkages supplied by the particular cationic monomer used, or a cationic vinyl polymer, for example, a copolymer of vinyl acetate and diallyldimethylammonium chloride, can be hydrolyzed to convert the acetate groups to hydroxyl groups. In any case, the cationic polymer desirably contains 80 to 98 mol percent alcoholic linkages, for example

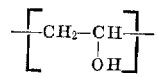

and about 2 to 20 mol percent of cationic linkages.

The cross-linking constituent of the polymers of this invention is a polyaldehyde, preferably glyoxal. It is to be understood that the term "polyaldehyde" is intended to include allaldehyde compounds containing more than one aldehyde group, i.e., dialdehydes as well as trialdehydes, etc. The cationic polymer is cross-linked in its reaction with the polyaldehyde and is rendered thermosetting and ready for use in the paper-making process.

The cross-linked thermosetting resins of this invention are preferably adsorbed on cellulose, paper-making fibers in an aqueous suspension, and the suspension is then formed into a wet-laid web. The web is dried to produce the temporary wet-strength paper product of this invention.

The invention consists in the novel compositions, methods, steps and improvements shown and described. It is to be understood that both the foregoing general description and the following detailed description are exemplary and explanatory, but are not restrictive of the invention.

In accordance with one embodiment of the present invention, an unsaturated, aliphatic, alcohol monomer is polymerized to produce a polymer containing a multiplicity of hydroxy substituents on the polymer chain and this polymer is then modified with cyanamide to render it cationic. Unsaturated aliphatic alcohols (or combinations thereof) which can be used to prepare the polymers of this invention include allyl alcohol, methallyl alcohol, β-hydroxyethyl acrylate, β-hydroxyethyl methacrylate, β-hydroxypropyl acrylate, β-hydroxypropyl methacrylate and the like. The preferred hydroxy-substituted polymer is polyvinyl alcohol, which is prepared by polymerizing and then hydrolyzing vinyl acetate. Polyvinyl alcohol has the

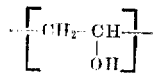

repeating linkage in the polymer chain.

The reactive hydroxy substituents on the polymer chain are provided by polymerization of the various unsaturated aliphatic alcohols used to prepare the polymer. For example, polymerized allyl alcohol contains the repeating linkage

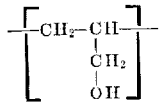

and polymerized β-hydroxyethyl methacrylate contain the repeating linkage

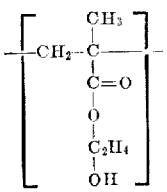

The polymerized unsaturated alcohols thus contain a multiplicity of hydroxy substituents, bonded either directly or indirectly to the polymer chain. These polymerized alcohols are reacted with cyanamide, in accordance with this invention, to convert a portion of the hydroxy substituents of the polymers to cationic isourea groups. Equation I below shows, by way of example, the conversion of a single linkage of a polyvinyl alcohol polymer chain to a cationic isourea group by the cyanamide modification reaction.

1
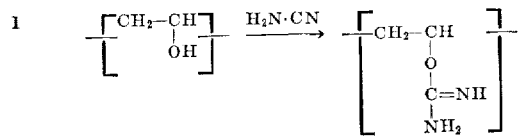

Desirably, sufficient cyanamide is reacted with the alcohol polymer to convert between about 2 and 20 percent of the alcoholic linkages of the polymer to cationic isourea linkages, leaving about 80 to 98 percent of the alcoholic linkages unmodified.

The reaction between the polymeric alcohol and cyanamide is exothermic but requires a temperature of about 70° C. for initiation. The resulting cyanamide-modified, cationic, polymeric alcohol is then ready for the cross-linking reaction with glyoxal or another suitable polyaldehyde to prepare the temporary wet-strength resins of this invention.

In an alternative embodiment of this invention an unsaturated, aliphatic alcoholic monomer is copolymerized with one or more cationic monomers to provide a cationic copolymer suitable for reaction with a polyaldehyde to provide the temporary wet-strength resins of this invention.

The same unsaturated alcohol monomers utilized in the above-described first embodiment of this invention are also useful in this alternate, copolymerization process. Thus, allyl alcohol, β-hydroxyethyl acrylate, β-hydroxypropyl acrylate, β-hydroxyethyl methacrylate and β-hydroxypropyl methacrylate, and the like are suitable unsaturated alcoholic monomers for this reaction. Vinyl acetate is the preferred unsaturated, alcoholic monomer. After polymerization with the cationic monomer, and hydrolysis, the vinyl acetate linkages in the polymer chain provide the preferred

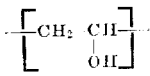

linkages utilized in this invention.

Cationic monomers which can be copolymerized with these unsaturated alcoholic monomers include diallyldimethylammonium chloride, 2-vinylpyridine, aminoethyl vinyl ether, 2-vinyl-N-methylpyridinium chloride, (p-vinylphenyl)-trimethyl ammonium chloride and 2-(dimethylamino)ethyl methacrylate, and the like. The cationic linkages provided in the polymer chain by these cationic monomers are exemplified below by two of the preferred cationic monomers of this invention.

diallylmethylammonium chloride     aminoethyl vinyl ether

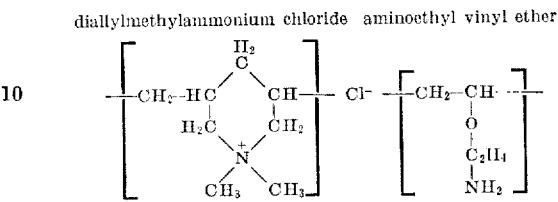

The polymerization reaction mixture used in accordance with this embodiment of the invention comprises about 80 to 98 mol percent of unsaturated, aliphatic, alcoholic monomer and about 2 to 20 mol percent of the cationic monomer. The resulting cationic copolymer has a mol ratio of alcoholic monomer linkages to cationic monomer linkages between about 49:1 and about 4:1.

The copolymerization reaction is normally carried out at temperatures of about 55 to 100° C. under reflux. The reaction mixture can contain water and organic diluents such as isopropanol, methanol or acetone. Any of the common free radical catalysts such as ammonium persulfate or benzoyl peroxide may be used in the copolymerization.

The resulting cationic copolymer is then ready for reaction with glyoxal or other polyaldehydes to prepare the temporary wet-strength resins of this invention.

If desired, one or more additional monomers can be interpolymerized with the unsaturated alcoholic monomers and cationic monomers. These additional monomers provide linkages in the polymer chain which are inert to reaction with polyaldehydes. Suitable inert monomers include acrylonitrile, styrene, lower alkyl esters of acrylic acid and methacrylic acid, and the like. The inclusion of one or more of these inert monomers in the copolymerization reaction mixture produces diluent units in the polymer chain such as those set forth below.

acrylonitrile      styrene      ethyl acrylate

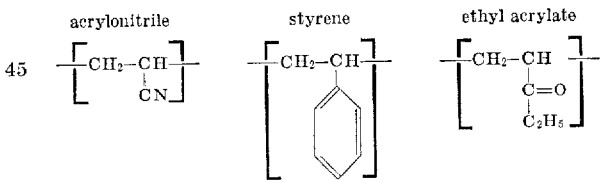

Inert diluent linkages such as these can be present in the polymer chains of the cationic copolymers produced in accordance with this invention in amounts of up to about 25 mol percent of the polymer.

After the cationic, unsaturated, aliphatic alcohol polymer has been prepared, either by cyanamide modification of an alcoholic homopolymer, or by copolymerization of an unsaturated alcoholic monomer and a cationic monomer, it is reacted with a polyaldehyde. The cationic groups of the polymer can be quaternized prior to reaction with the polyaldehyde, if desired. This quaternization can be effected by reaction of the cationic groups with methyl chloride, dimethyl sulfate, benzyl chloride and the like. Quaternization has been found to enhance the cationic properties of the polymer.

The reaction of the cationic unsaturated alcohol polymer with a polyaldehyde is desirably performed by adding an aqueous solution of the polyaldehyde to a neutral or slightly alkaline, aqueous solution of the cationic unsaturated alcohol polymer at room temperature. The reaction is allowed to continue until a desired increase in viscosity is observed, indicating that sufficient cross-linking has occurred. The aqueous solution then contains the partially cross-linked, thermosetting polymer of this invention, ready for use.

Glyoxal is the preferred cross-linking aldehyde reactant of this invention. Other di- or polyaldehydes can, however, be used in partial or complete substitution for glyoxal, if desired. Exemplary of these di- and polyaldehydes are hydroxyadipaldehyde, glutaralydehyde, succinaldehyde, and the like.

An amount of polyaldehyde sufficient to react with at least about 5 percent of the reactive hydroxyl and cationic substituents of the parent, cationic polymer chains is used in preparing the final thermosetting polymers of this invention. It is usually desirable, however, to add sufficient glyoxal, or other polyaldehyde, to the cationic polymer to react with about 15 to 50 percent of the reactive hydroxyl and cationic substituents of the parent polymer chain.

Large excess amounts of polyaldehyde can be present in the reaction mixture without detriment, and thus no maximum limit on the amount of polyaldehyde present need be prescribed. The excess polyaldehyde merely remains free in the solution and has no adverse effect on the subsequent use of the thermosetting polymer.

The polymers of this invention are desirably employed in the manufacture of temporary wet-strength paper in the form of dilute aqueous solutions. These solutions can be applied to pre-formed paper by the "tub" method, but more desirably, the polymer solutions are added directly to fibrous, paper-making suspension at any point in the paper-making system where wet-strength resins are customarily added.

The thermosetting polymers of this invention are rapidly and effectively adsorbed by conventional cellulose paper-making fibers at a wide range of pH's, preferably at pH 4.5 to 8.5. The use of retention aids in adsorption of the thermosetting polymers of this invention is generally not necessary.

Significant improvement in the wet strength of paper treated with the polymers of this invention can be achieved by the addition to the fibers of as little as about 0.25 percent by weight of the polymer, based on the dry weight of the fibers treated. Even smaller amounts of the polymer will produce some improvement in wet strength.

Generally, any desired maximum amount of the wet-strength resins of this invention can be added to paper fibers. However, amounts ranging between about 0.25 and 3.0 percent by weight of the polymer, based on the dry weight of the fibers treated, usually afford most advantageous results.

After the thermosetting polymers of this invention have been adsorbed on the paper-making fibers in aqueous suspension, the suspension is formed into a water-laid web of fibers, containing adsorbed polymer, and this web is dried in accordance with conventional paper-making techniques. This procedure yields a temporary wet-strength paper product composed of water-laid cellulose fibers bonded together by an adsorbed content of the cationic polymers of this invention in the thermoset state.

The paper products of this invention have the unusual characteristic of temporary wet strength. They thus provide the wet strength necessary in tissues, toweling and the like, to allow the use of such paper products in normal household or industrial tasks. Because of the temporary character of the wet strength imparted by the polymers of this invention, however, paper products produced in accordance with the teachings of this application can be disposed of in conventional septic systems, without fear of clogging toilets, sewer lines or the like.

Many other uses for the temporary wet-strength paper products of this invention will be readily apparent to those skilled in the art, and this application is, of course, not to be construed as being limited to products intended for any particular use.

For a clearer understanding of the invention, specific examples of it are set forth below. These examples are merely illustrative and are not to be understood as limiting the scope and underlying principles of the invention in any way. All parts and percentages referred to herein are by weight unless otherwise specifically indicated.

EXAMPLE 1

Exactly 21.6 parts of polyvinyl alcohol (molecular weight approximately 100,000), 10.5 parts cyanamide and 2.0 parts of ammonium chloride are dissolved in 67 parts of deionized water. The resulting solution is heated to about 45° C. and 28.8 parts of cyanamide dihydrochloride are gradually added with stirring, the temperature being maintained at 45–50° C. by application of external heat. When the cyanamide dihydrochloride is dissolved, the temperature is slowly raised to 75° C. at which point a vigorous exothermic reaction occurs. The temperature is maintained below 85° C. by cooling externally. When the reaction subsides, the solution is cooled to room temperature and diluted with 100 parts of deionized water. The polymer is isolated by adding the solution to a large excess of acetone and drying under vacuum at room temperature. The resulting polymer contains about 5 mol percent of isourea hydrochloride substituents.

Two (2) parts of the polymer are dissolved in 20 parts of water and the pH of the solution is adjusted to 8.0 with potassium carbonate solution. Eleven (11) parts of the solution, which has a Gardner-Holt viscosity of U at room temperature, are mixed at pH 7.5 with 0.60 parts of a 40 percent aqueous solution of glyoxal. The pH of the resulting solution is 6.8. The pH of the solution is then adjusted to 7.5 with dilute aqueous potassium carbonate, and the resulting solution has a Gardner-Holt viscosity of T. The solution is allowed to stand at room temperature for about 30 minutes and its viscosity increases to Z–1 on the Gardner-Holt scale. The glyoxal-modified polymer is then diluted to 5% by volume with water. No further increase in the viscosity of the solution is observed. The glyoxal cross-linked polymer is cationic, water-soluble and thermosetting.

A second batch of the polyvinyl alcohol polymer, containing 5 mol percent isourea groups in the form of hydrochloride salts is also observed for comparative purposes. No viscosity change occurs in this polymer, indicating that is the glyoxal reaction which produces the increase in viscosity of the first batch of polymer.

EXAMPLE 2

The procedure of Example 1 is repeated in this example, except that two (2) parts of a homopolymer of β-hydroxyethyl acrylate (molecular weight=10–25,000) is substituted for the polyvinyl alcohol polymer used in Example 1. Results substantially similar to those achieved in Example 1 are attained in this example. The final, glyoxal cross-linked polymer product is cationic, water-soluble and thermosetting.

EXAMPLE 3

A reaction vessel equipped with reflux condenser, three (3) dropping funnels, stirrer and thermometer is charged with 25 parts of water and 25 parts of isopropanol. Three solutions are prepared: (1) 10 parts of diallyldimethylammonium chloride in 25 parts of water, (2) 40 parts of vinyl acetate in 40 parts of isopropanol, and (3) 0.50 parts of ammonium persulfate in 15 parts of water. The three solutions are added simultaneously but separately to the reaction vessel at reflux over the course of two hours after which the solution is refluxed an additional two hours.

The molar ratio of vinyl acetate to diallyldimethylammonium chloride in the reaction mixture is about 7.5:1. To the reaction mixture is added 50 g. of 40 percent aqueous sodium hydroxide and the reflux is maintained for one hour to convert the acetate to hydroxyl groups. The solution is then cooled and added to a large volume of acetone to precipitate the polymer.

The product if this reaction is a substantially linear, non-thermosetting, cationic polyvinyl alcohol-diallyldimethylammonium chloride copolymer having a molecular weight in the range of 5,000 to 20,000. It is substantially composed of linkages having the theoretical formulae

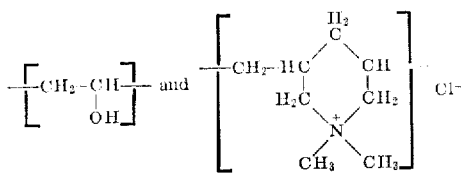

This cationic copolymer dissolves easily in water to form a clear 10 percent solution. Fifty parts of this solution are adjusted to a pH of 7.5 and mixed with 5 parts of 40 percent aqueous glyoxal, also at pH 7.5. The pH of the resulting solution is adjusted to 7.5 with aqueous potassium carbonate solution and the mixture is allowed to stand at room temperature for about 30 minutes. A viscosity change similar to that occurring in Example 1 is observed. The copolymer-glyoxal reaction product is then diluted to about 5 percent with water, and no further increase in viscosity is observed. The glyoxal cross-linked polymer is cationic, water-soluble and thermosetting.

EXAMPLE 4

The procedure of Example 3 is repeated in this example, except that the cationic polymer is a copolymer of β-hydroxypropyl methacrylate and 1,2-dimethyl - 5 - vinylpyridinium methosulfate. The methacrylate replaces the vinyl acetate and the pyridinium compound replaces the diallyldimethylammonium chloride. No sodium hydroxide is added since no hydrolysis is necessary. The cationic copolymer produced from these monomers is a substantially lecular weight in the range of 5,000 to 20,000. It is substantially composed of linkages having the theoretical formulae

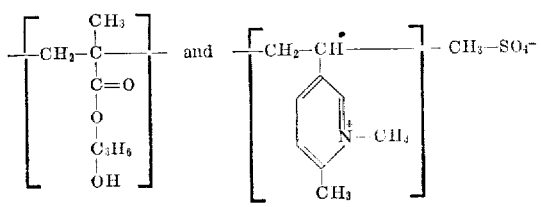

This polymer dissolves easily in water to form a clear solution.

After reaction with glyoxal, a viscosity increase occurs similar to that observed in Example 3. The glyoxal reacted polymer is cationic, water soluble and thermosetting.

EXAMPLE 5

The procedure of Example 3 is repeated in this example except that 6 parts of acrylonitrile are included in the initial reaction mixture. The resulting cationic polymer contains about 30 mol percent

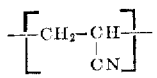

linkages. The glyoxal cross-linked polymer is similar to that obtained in Example 3.

EXAMPLE 6

The procedure of Example 1 is repeated in this example except that glutaraldehyde is substituted for the glyoxal used in Example 1. The results achieved are substantially similar to those of Example 1.

EXAMPLE 7

A quantity of each of the temporary wet-strength resins produced in Examples 1–6 is added to separate suspensions of bleached, softwood, paper-making fibers at 0.6 percent consistency. The amount of resin added to each fiber suspension is equal to 1 percent of the dry weight of the fibers. The pH of each batch is adjusted to 7.0 and each batch is stirred briefly to permit the polymer to be adsorbed by the fibers. The fibers are then formed into water-laid webs, pressed and dried at 230° F. for 1 minute to produce a sheet of 50 lb. basis weight from each batch of resin-treated fibers.

Strips are cut from these sheets and soaked for 5 to 10 minutes in deionized water. The six (6) strips produced in accordance with this invention show a wet tensile strength of about 3.5 lbs./in. after this period of soaking.

Comparative samples are prepared from bleached, softwood, paper-making fibers of 0.6 percent consistency, impregnated with 1 percent based on the dry weight of the fibers of a cationic polyvinyl alcohol polymer which is produced by the first step of the procedure of Example 1 but not cross-linked with glyoxal. These samples, after a 5 to 10 minute soaking period in deionized water, have a wet tensile strength of about 1.5 lbs./in.

Comparative paper sheets are also produced with no resin treatment. These sheets exhibit a wet tensile strength of about 0.5 to 1 lb./in. after a 5 to 10 minute soaking period in deionized water.

To establish the temporary nature of the wet strength imparted by the resins of this invention, the paper samples prepared in accordance with Examples 1–4 are soaked overnight in deionized water. After this period of soaking, the paper samples have such low wet strength that they readily disintegrate into fibers.

The invention in its broader aspects is not limited to the specific details shown and described, but departures may be made from such details within the scope of the accompanying claims without departing from the principles of the invention and without sacrificing its chief advantages.

What is claimed is:

1. A water-soluble, cationic polymer of an unsaturated, aliphatic alcohol which has been reacted with a sufficient amount of a polyaldehyde to render it thermosetting, said polymer carrying reactive hydroxyl and cationic substituents, at least 5% of said substituents being so reacted.

2. A cationic cyanamide-modified polyvinyl alcohol polymer according to claim 1.

3. A cationic polymer according to claim 2 which contains about 80 to 98 percent

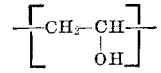

linkages and about 2 to 20 percent

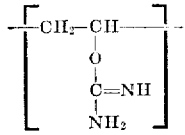

linkages.

4. A copolymer of an unsaturated, aliphatic alcohol monomer and a cationic monomer, said copolymer being a polymer according to claim 1.

5. A water-soluble cationic copolymer of an aliphatic alcohol monomer is selected from the group consisting of vinyl acetate, allyl alcohol, methallyl alcohol, β-hydroxyethyl acrylate, β-hydroxyethyl methacrylate, β-hydroxypropyl acrylate and β-hydroxypropyl methacrylate, with a cationic monomer selected from the group consisting of diallyldimethylammonium chloride, 2-vinylpyridine, aminoethyl vinyl ether, 2-vinyl-N-methylpyridinium chloride, (p-vinylphenyl)-trimethylammonium chloride and 2-(dimethylamino)ethyl methacrylate, said copolymer being a polymer according to claim 4.

6. A water-soluble cationic interpolymer of an aliphatic alcohol monomer, a cationic monomer and at least one inert, unsaturated monomer which is interpolymerizable with the aliphatic alcohol monomer and the cationic monomer but provides linkages in said polymer which are not reactive with the polyaldehyde, said interpolymer being a polymer according to claim 1.

7. A polymer according to claim 1 wherein the polyaldehyde is selected from the group consisting of glyoxal, hydroxyadipaldehyde, and glutaraldehyde.

8. Paper of temporary wet-strength composed of water-laid cellulose fibers bonded together by an adsorbed content of the cationic polymer of claim 1 in thermoset state in an amount sufficient to impart temporary wet strength.

9. The paper of claim 8 wherein the cationic polymer is the thermoset, cross-linked product of the reaction of: (a) a cyanamide-modified polyvinyl alcohol polymer containing about 80 to 98 mol percent

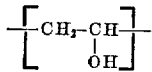

linkages and about 2 to 20 mol percent

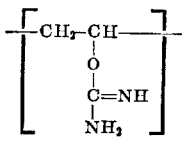

linkages, and (b) sufficient glyoxal to react with at least about 5% of the reactive hydroxyl and isourea groups of the modified polyvinyl alcohol polymer.

10. A process of making temporary wet-strength paper which comprises adsorbing in an amount sufficient to impart temporary wet strength the polymer of claim 1 on cellulose paper-making fibers in an aqueous suspension at a pH between about 4.5 and 8.5, forming said suspension into a water-laid web and drying said web thereby thermosetting said polymer.

References Cited

UNITED STATES PATENTS

| | | | |
|---|---|---|---|
| 3,037,963 | 1/1962 | Christenson et al. | 260—73X |
| 3,051,691 | 8/1962 | Elizer et al. | 260—91.3 |
| 3,379,703 | 4/1968 | Ehmann et al. | 260—73X |
| 3,395,072 | 7/1968 | Talet et al. | 117—155U(X) |

S. LEON BASHORE, Primary Examiner

F. FREI, Assistant Examiner

U.S. Cl. X.R.

162—164, 168; 260—72R, 73R, 80.75, 91.3VA

Case 20,938
Aug. 17, 1971

UNITED STATES PATENT OFFICE
CERTIFICATE OF CORRECTION

Patent No. 3,597,313      Dated August 3, 1971

Inventor(s) Laurence Lyman Williams and Anthony Thomas Coscia

It is certified that error appears in the above-identified patent and that said Letters Patent are hereby corrected as shown below:

Column 1, line 36 "papermaking" should read -- paper-making --.
Column 2, line 39 "allaldehyde" should read -- all aldehyde --.
Column 3, line 11 "contain" should read -- contains --.
Column 5, line 31 "pH's" should read -- pHs --.

Column 6, line 42 "that is" should read -- that it is --; Column 6, line 74 "if" should read -- of --.
Column 7, line 34 "lecular weight" should read -- linear, non-thermosetting cationic polymer having a molecular weight --.
Column 8, line 60 "methallyl" should read -- methally --.
Column 10, line 8 "web" (second occurrence) should read -- web, --.

Signed and sealed this 8th day of February 1972.

(SEAL)
Attest:

EDWARD M. FLETCHER, JR.
Attesting Officer

ROBERT GOTTSCHALK
Commissioner of Patents